3,310,370
PROCESS FOR REMOVING HEAVY METAL CONTAMINANTS FROM POTASSIUM CHLORIDE SOLUTIONS
Kenneth K. Kendall, Jr., Anaheim, Calif., assignor to United States Borax & Chemical Corp., Los Angeles, Calif., a corporation of Nevada
No Drawing. Filed Dec. 18, 1964, Ser. No. 419,596
6 Claims. (Cl. 23—89)

This invention relates to a process for removing heavy metal contaminants from potassium chloride solutions and, more particularly, to a method of treating potassium chloride solutions with sodium silicate whereby potassium chloride, in the physical form of solutions or crystals, may be obtained which is substantially free from heavy metal contaminants. This invention particularly relates to the removal of chromium, lead, and copper contaminants from potassium chloride solutions; however, it is also contemplated that vanadium, iron, and silver, as well as other heavy metal impurities, can be removed from such solutions.

It is well known that numerous commercial consumers of potassium chloride require a product which is substantially free of the above-mentioned impurities. Various methods have been suggested for the production of such a product; however, in general, the known methods have been relatively unsuccessful or have produced a product which does not have the desired purity or when successful have been extremely expensive.

Accordingly, it is the object of the present invention to provide a novel process for producing potassium chloride which is substantially free from undesirable impurities. It is an additional object to provide a novel method for producing potassium chloride which is substantially free from chromium, lead and copper contaminants.

In accordance with the method of this invention, it has been found that when a solution of sodium silicate is added to a hot potassium chloride solution, the potassium chloride solution becomes turbid and then flocculent. The flocculent material can easily be removed whereby there is produced a potassium chloride solution which is substantially free from the heavy metal impurities. Further treatment will yield potassium chloride crystals which are also substantially free from these undesirable impurities. In this manner, chromium, lead and copper contamination of potassium chloride solutions may be reduced to a very small fraction of its original concentration. More particularly, the novel process of the present invention comprises adding sodium silicate in an amount corresponding to 50–340 p.p.m. of silica to a hot solution containing approximately 34–36% by weight potassium chloride, maintaining said hot, sodium silicate treated solution at approximately 100° C. for a sufficient period of time to form a flocculent percipitation, and separating from said solution the flocculent precipitate. This produces a potassium chloride solution which is substantially free of its initial chromium, lead and copper impurities; however, sufficient cooling of the solution will result in the crystallization of substantially chromium, lead and copper impurity-free potassium chloride crystals. In this manner, it is possible to obtain potassium chloride meeting the following specification:

| Contaminant: | Maximum, p.p.m. |
|---|---|
| Copper | 0.1 |
| Lead | 0.2 |
| Chromium | 0.02 |

For the purpose of illustration, the following examples are presented. The examples set forth below are included in this specification as preferred forms of the present invention, but it is not intended that the invention should be limited in any way to the specific examples given since various changes may be made without departing from the scope of the present invention as will be apparent and understood by one skilled in the art.

*Example 1*

A two kilogram solution containing 34.6% potassium chloride, 4 p.p.m. copper ion, 1 p.p.m. lead ion, and 0.25 p.p.m. chromium ion was prepared from chemical grade materials. A solution of 0.70 gram of chemical grade sodium metasilicate pentahydrate in 9 ml. of water was rapidly added, dropwise, to the stirred, impure potassium chloride solution. The sodium metasilicate pentahydrate that was added corresponded to 100 p.p.m. of silica ($SiO_2$) in the solution. The brine was held at about 100° C. while stirring continued and subsequently the brine became turbid. Twenty minutes after the addition of the sodium metasilicate pentahydrate, the brine, which was then flocculent, was filtered through a preformed Celite filter bed on a single sheet of Whatman No. 41 filter paper in an 18.5 cm. heated Buchner funnel. The filtrate was immediately crystallized in a water-ice bath, and the potassium chloride crystals were separated from the mother liquor by filtration. The concentrations of the chromium, lead and copper impurities in the mother liquor and the product were determined and the results are given in Table 1, infra.

*Example 2*

A 2.1 kilogram solution containing 34.3% potassium chloride, 9.7 p.p.m. copper ion, and 9.7 p.p.m. lead ion was prepared from chemical grade materials. As the yellow solution was mechanically stirred, a solution of 2.4 grams of sodium metasilicate pentahydrate in about 20 ml. of water was added in rapid stream of drops. The sodium metasilicate pentahydrate that was added corresponded to 330 p.p.m. of silica. The brine, which then turned colorless, was held at about 100° C. while the stirring continued. During this holding period, the brine became turbid and slightly greenish. Twenty minutes after the addition of the sodium metasilicate pentahydrate, the brine was filtered through a preformed Celite filter bed on a single sheet of Whatman No. 41 filter paper in an 18.5 cm. heated Buchner funnel. The concentrations of the copper and lead impurities in the brine were determined and the results are also given in Table I, infra.

*Example 3*

A 2 kilogram solution containing 34.6% potassium chloride, 10 p.p.m. copper ion, and 10 p.p.m. lead ion was prepared from chemical grade materials. To this solution, while it was mechanically stirred, there was added a solution of 2.39 grams of sodium silicate ($Na_2O:3.2\ SiO_2$, 40° Bé.) in a rapid, but dropwise manner. The sodium silicate solution that was added corresponded to 329 p.p.m. of silica in the brine. After the sodium silicate addition, which took approximately two minutes, the brine was slightly turbid, with small flocs, and was a very pale yellow-green. The temperature was permitted to gradually rise from about 100° C. to just below the boiling point of the solution. Twenty minutes after the reagent addition, the brine was filtered through about 200 ml. of Celite on one sheet of Whatman No. 41 filter paper in an 18.5 cm. heated Buchner funnel. The adhering brine was displaced with a small water wash and combined with the filtrate, which was slightly turbid and a very pale green. The brine was diluted to 25% potassium chloride and analyzed to determine the copper and lead contents and the results of that determination are given in Table I, infra.

TABLE 1.—SODIUM SILICATE TREATMENT

| Dosage as SiO₂, p.p.m. | Elapsed time between reagent addition and filtration, minutes | Filter | Metal Ion in Brine, p.p.m. | | | | | |
|---|---|---|---|---|---|---|---|---|
| | | | Cu | | Pb | | Cr | |
| | | | N.T.[a] | T.[b] | N.T. | T. | N.T. | T. |
| 100 | 20 | Celite | 4.0 | c0.14 | 1.0 | c<0.05 | 0.25 | c<0.04 |
| 330 | 20 | do | 9.7 | 0.08 | 9.7 | 0.06 | (d) | |
| 329 | 20 | do | 10 | 0.29 | 10 | 0.22 | (d) | |

[a] Not treated.
[b] Treated.
[c] Calculated from concentration in mother liquor and crystals.
[d] Not added.

The above-noted invention can be utilized with any apparatus which will afford the desired results and, as such, the actual apparatus utilized does not form a part of the present invention. The sodium silicates suitable for use in the present invention can be defined as having a $Na_2O:SiO_2$ weight ratio of from about 1:0.5 to about 1:4. Of course, any of the various hydrates can be advantageously employed. The preferred grade of the sodium silicate reagent is $Na_2O:3SiO_2$ (weight ratio) as this grade provides sufficient alkalinity for the requirements of the process. Thus, the term "sodium silicate" additionally includes sodium metasilicate pentahydrate, sodium metasilicate 9-hydrate, other well-known sodium silicates having different weight ratios of sodium oxide to silica, mixtures thereof, and the like. However, it is contemplated that any sodium silicate can be utilized to achieve the desirable results of the present invention. In general, the sodium silicate is added in an amount sufficient to provide 50–340 p.p.m. of silica in the solution, but preferably it is added so as to provide 100–330 p.p.m. of silica. The actual amount of sodium silicate, within the applicable range, to be added will depend upon the initial concentration of impurities and the desired impurity concentration in the final product. Such a determination can easily be made when one skilled in the art is faced with specific operating conditions. The potassium chloride solution is generally held at approximately 100° C. although, as noted in Example 3, the temperature may rise to a point just below the boiling point of the solution. In the examples set forth in this specification, it should be noted that the holding time at the elevated temperature was approximately 20 minutes. It will be appreciated that this holding period may vary according to the size of the batch being operated upon and that this time is merely indicated as being sufficient in relation to the specific examples enumerated. The examples disclosed in this specification indicate that filtration is an applicable step for separating the flocculent precipitate from the potassium chloride solution. It is, of course, contemplated that means other than filtration can be utilized to achieve the same result. For example, centrifugation can be used or the precipitate can merely be allowed to settle and the solution removed as an overflow.

The treatment of the potassium chloride solution with the sodium silicate reagent yields a product which is substantially free from heavy metal impurities and, in particular, chromium, lead and copper impurities, as can be seen in Table I. The treated potassium chloride will meet various specifications which have, generally, prior to this invention, been unobtainable or obtainable only after a lengthy and expensive process. On the other hand, it has been calculated that the cost of the sodium silicate reagent alone is approximately five cents per ton of product; thus, one can easily visualize the economic feasibility of the present invention.

It will be understood that many other modifications are possible in the operations that have been described herein without departing from the true spirit and scope of the invention.

What is claimed is:

1. A process for the production of potassium chloride substantially free of chromium, lead and copper impurities which comprises adding an aqueous solution of sodium silicate to a hot potassium chloride solution containing said impurities; maintaining said hot, sodium silicate treated potassium chloride solution at an elevated temperature for a sufficient period of time to form a flocculent precipitate; separating from said solution the flocculent precipitate; and cooling said solution thereby crystallizing substantially chromium, lead and copper impurity-free potassium chloride therefrom.

2. The process of claim 1 wherein the potassium chloride solution is substantially saturated with potassium chloride.

3. The process of claim 1 wherein the sodium silicate is selected from the group consisting of $Na_2O:3SiO_2$, sodium metasilicate pentahydrate, sodium metasilicate 9-hydrate, and mixtures thereof.

4. A process for the production of potassium chloride substantially free of chromium, lead and copper impurities which comprises heating a potassium chloride solution to approximately 100° C., said potassium chloride solution containing 34–36% by weight potassium chloride at said elevated temperature; adding an aqueous solution of sodium silicate to said hot potassium chloride solution in an amount corresponding to 50–340 p.p.m. of silica; maintaining said hot, sodium silicate treated solution at approximately 100° C. for a sufficient period of time to form a flocculent precipitate; separating from said solution the flocculent precipitate; and cooling said solution thereby crystallizing substantially chromium, lead and copper impurity-free potassium chloride therefrom.

5. The process of claim 4 wherein the sodium silicate is selected from the group consisting of $Na_2O:3SiO_2$, sodium metasilicate pentahydrate, sodium metasilicate 9-hydrate, and mixtures thereof.

6. The process of claim 4 wherein the sodium silicate is added in an amount corresponding to approximately 100–330 p.p.m. of silica in the brine.

References Cited by the Examiner
UNITED STATES PATENTS 2,703,272  3/1955  Fuchsman _____ 23—89
2,788,257  4/1957  Duke _____ 23—89

OTHER REFERENCES

Gregory book: "Uses and Applications of Chemicals and Related Materials," pp. 556 and 557 (1939 edition). Reinhold Pub. Corp., N. Y.

J. W. Mellor's "A Comprehensive Treatise on Inorganic and Theoretical Chemistry," vol. 6, 1925 edition, pp. 430. Longmans, Green and Co., N. Y.

Webster's Third International Dictionary, unabridged, 1963 edition, p. 919. G. and C. Merriam Co., Springfield, Mass.

OSCAR R. VERTIZ, *Primary Examiner.*

EDWARD STERN, *Examiner.*